United States Patent
Tobin et al.

(10) Patent No.: US 10,213,994 B2
(45) Date of Patent: Feb. 26, 2019

(54) METHODS FOR MANUFACTURING SPAR CAPS FOR WIND TURBINE ROTOR BLADES USING THERMOPLASTIC-BASED COMPOSITE PLATES

(71) Applicant: General Electric Company, Schenectady, NY (US)

(72) Inventors: James Robert Tobin, Simpsonville, SC (US); Christopher Daniel Caruso, Greenville, SC (US); Aaron A. Yarbrough, Greenville, SC (US); Daniel Alan Hynum, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 208 days.

(21) Appl. No.: 14/862,216

(22) Filed: Sep. 23, 2015

(65) Prior Publication Data
US 2017/0080648 A1 Mar. 23, 2017

(51) Int. Cl.
*B29C 47/00* (2006.01)
*B32B 27/12* (2006.01)
(Continued)

(52) U.S. Cl.
CPC .............. *B32B 27/12* (2013.01); *B29C 70/46* (2013.01); *B32B 1/00* (2013.01); *B32B 5/26* (2013.01);
(Continued)

(58) Field of Classification Search
CPC ......... Y02P 70/523; B32B 27/12; B32B 5/26; B32B 27/08; B29C 70/46; B29C 70/021; B29C 70/02; B29C 70/04; B29C 70/06
See application file for complete search history.

(56) References Cited

U.S. PATENT DOCUMENTS 4,608,220 A * 8/1986 Caldwell ................ A43B 17/14
264/258
4,995,931 A * 2/1991 Duthie ..................... B29C 51/12
156/212
(Continued)

FOREIGN PATENT DOCUMENTS

CN 101906251 B 6/2013
IN 201006838 P1 10/2009
(Continued)

OTHER PUBLICATIONS

Bannister, Damian, Materials Technology for the Wind Energy Market, May 2008, JEC Magazine #40, pp. 1-2.*
(Continued)

*Primary Examiner* — William P Bell
*Assistant Examiner* — Andrew L Swanson
(74) *Attorney, Agent, or Firm* — Dority & Manning, P.A.

(57) ABSTRACT

In one aspect, a method for manufacturing a spar cap for a wind turbine rotor blade may generally include stacking a plurality of plates together to form a plate assembly, wherein each of the plates is formed from a fiber-reinforced composite including a plurality of fibers surrounded by a thermoplastic resin material. The method may also include positioning the plate assembly relative to a mold defining a mold surface, wherein the mold surface is shaped so as to correspond to at least one blade parameter of the wind turbine rotor blade. In addition, the method may include applying pressure to the plate assembly via the mold such that at least a portion of the plate assembly conforms to the shape of the mold surface.

9 Claims, 13 Drawing Sheets

(51) Int. Cl.
  *B32B 5/26* (2006.01)
  *B32B 27/08* (2006.01)
  *B29C 70/46* (2006.01)
  *B32B 7/04* (2006.01)
  *B32B 1/00* (2006.01)
  *F03D 1/06* (2006.01)
  *B29K 101/12* (2006.01)
  *B29K 105/08* (2006.01)
  *B29K 105/00* (2006.01)
  *B29L 9/00* (2006.01)
  *B29L 31/08* (2006.01)

(52) U.S. Cl.
  CPC ............... *B32B 7/04* (2013.01); *B32B 27/08* (2013.01); *F03D 1/0675* (2013.01); *B29K 2101/12* (2013.01); *B29K 2105/08* (2013.01); *B29K 2105/256* (2013.01); *B29L 2009/00* (2013.01); *B29L 2031/085* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2305/10* (2013.01); *B32B 2398/20* (2013.01); *B32B 2603/00* (2013.01); *F05B 2280/6003* (2013.01); *F05B 2280/6013* (2013.01); *Y02E 10/721* (2013.01); *Y02P 70/523* (2015.11)

(56) References Cited

U.S. PATENT DOCUMENTS

| | | | |
|---|---|---|---|
| 5,066,351 A * | 11/1991 | Knoll | B29C 43/04 156/212 |
| 6,264,877 B1 | 7/2001 | Pallu De La Barriere | |
| 8,317,479 B2 | 11/2012 | Vronsky et al. | |
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,961,142 B2 | 2/2015 | Wansink | |
| 8,992,813 B2 | 3/2015 | Robbins et al. | |
| 2003/0146543 A1 * | 8/2003 | Lebrun | B29C 51/262 264/313 |
| 2009/0148300 A1 | 6/2009 | Driver et al. | |
| 2011/0243750 A1 * | 10/2011 | Gruhn | B29B 11/16 416/226 |
| 2013/0134621 A1 * | 5/2013 | Tsotsis | B29B 11/16 264/177.2 |
| 2013/0164133 A1 | 6/2013 | Grove-Nielsen | |
| 2014/0295187 A1 | 10/2014 | Jacobsen et al. | |
| 2016/0046064 A1 * | 2/2016 | Sartor | B29C 70/46 264/132 |
| 2018/0223797 A1 | 8/2018 | Caruso et al. | |

FOREIGN PATENT DOCUMENTS

| | | |
|---|---|---|
| JP | 2007092716 A | 4/2007 |
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

OTHER PUBLICATIONS

AZO Materials, Thermoplastics—An Introduction, Feb. 14, 2001, AZO Materials, https://www.azom.com/article.aspx?ArticleID=83 (Year: 2001).*

* cited by examiner

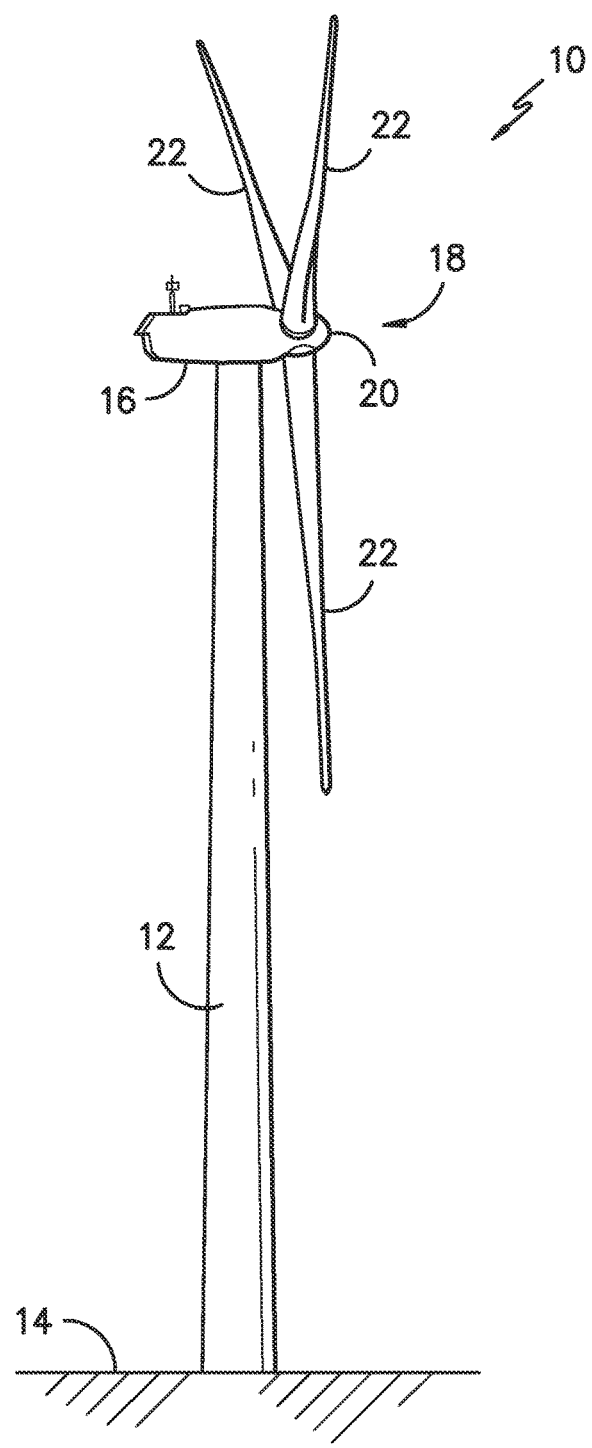
FIG. -1-

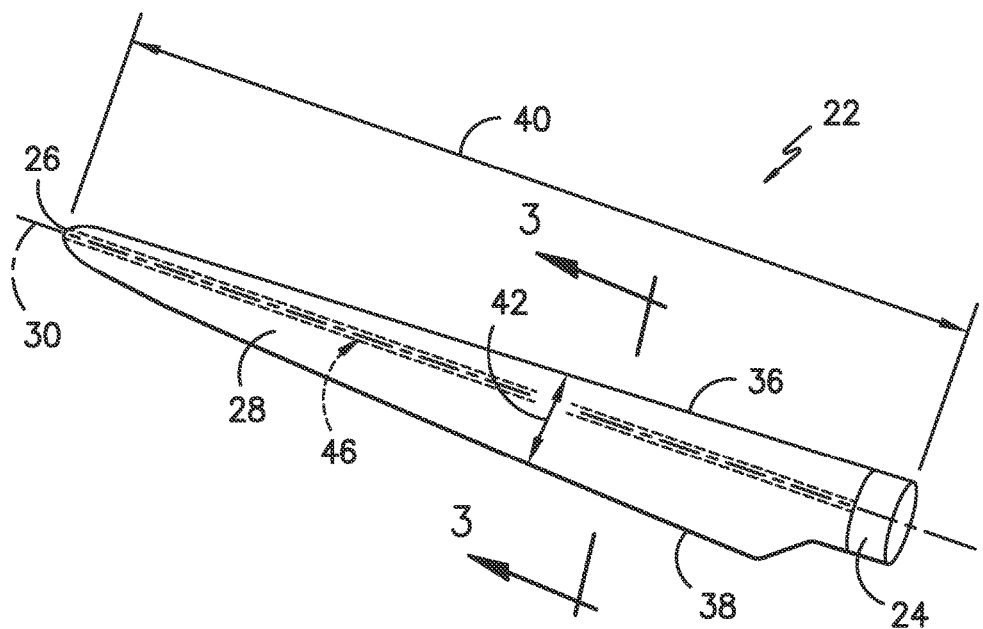
FIG. -2-
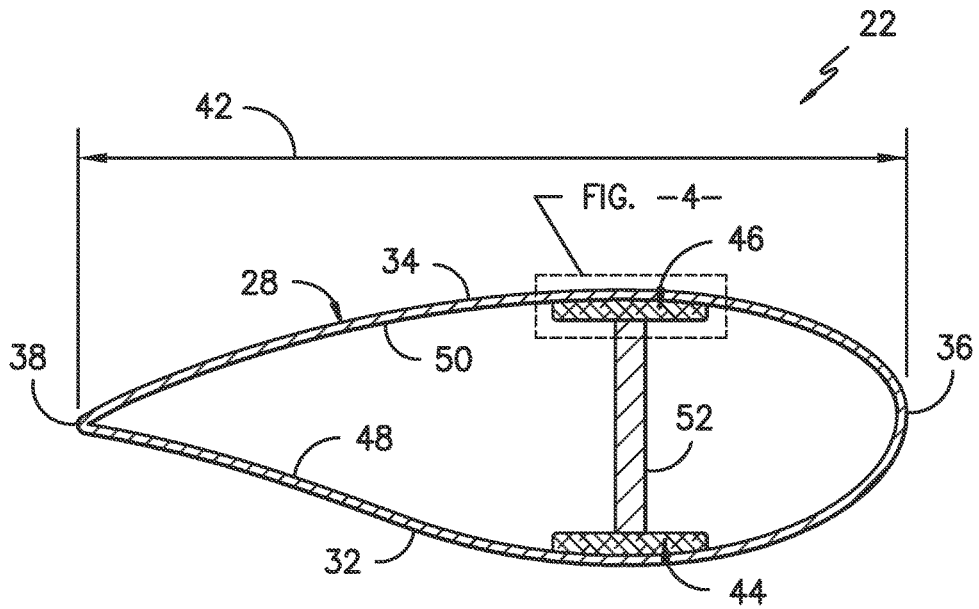
FIG. -3-

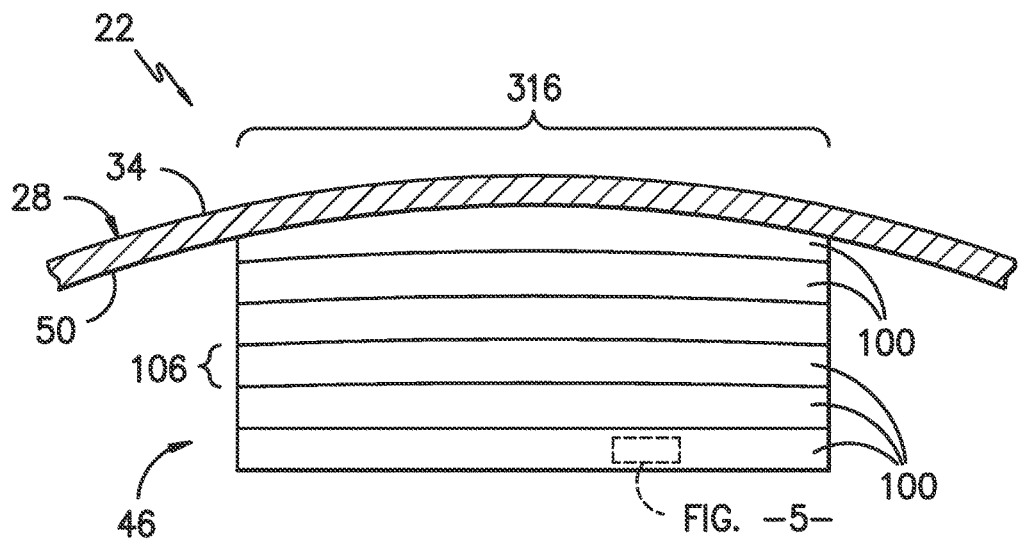
FIG. -4-
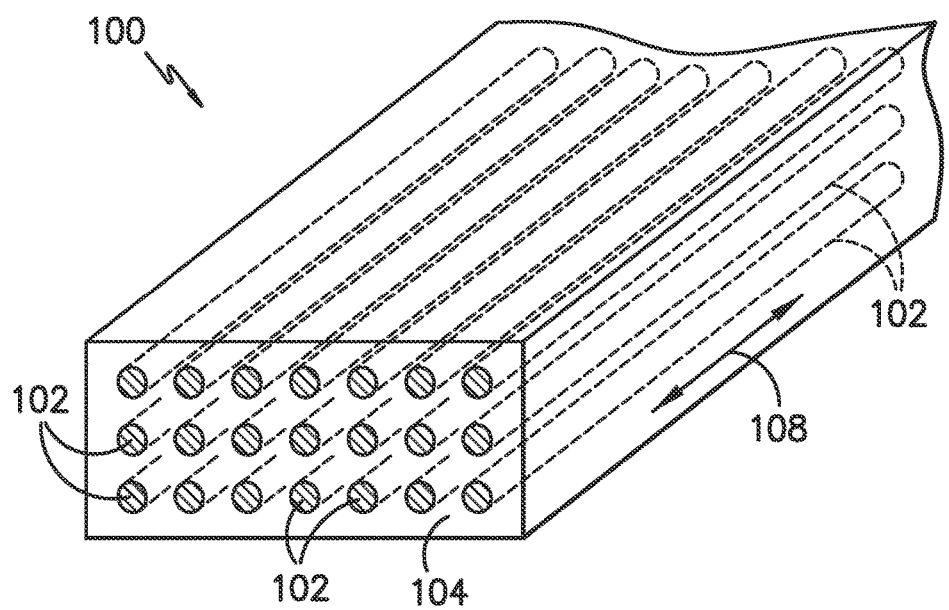
FIG. -5-

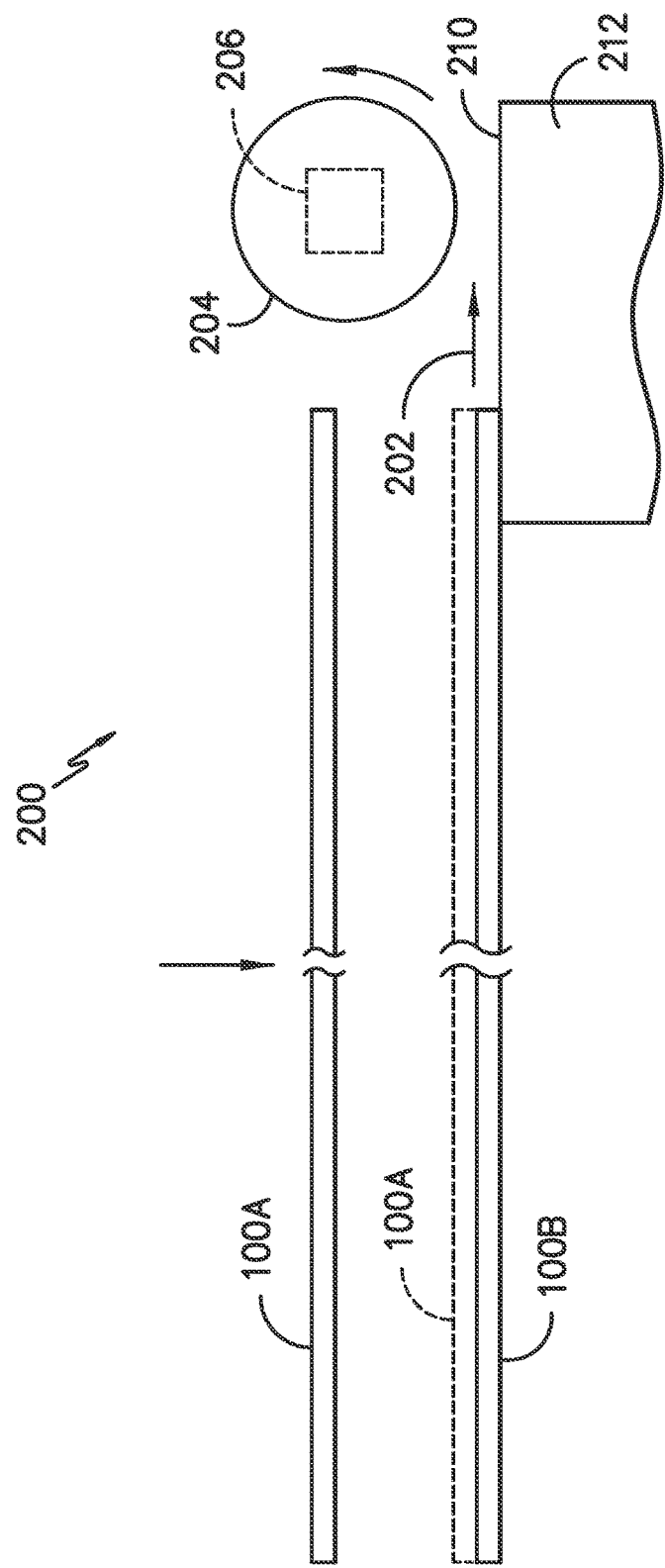
FIG. -6-

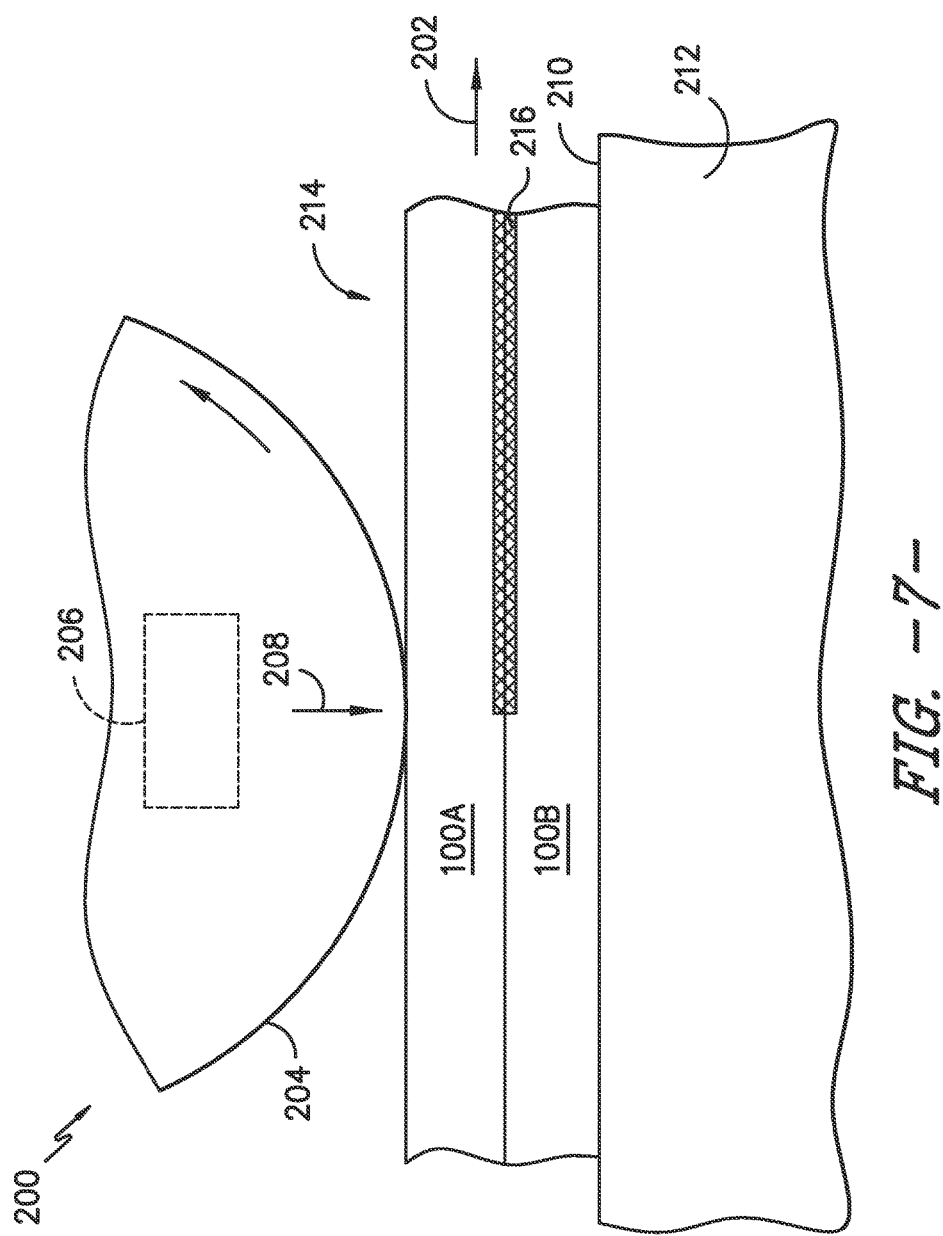
FIG. -7-

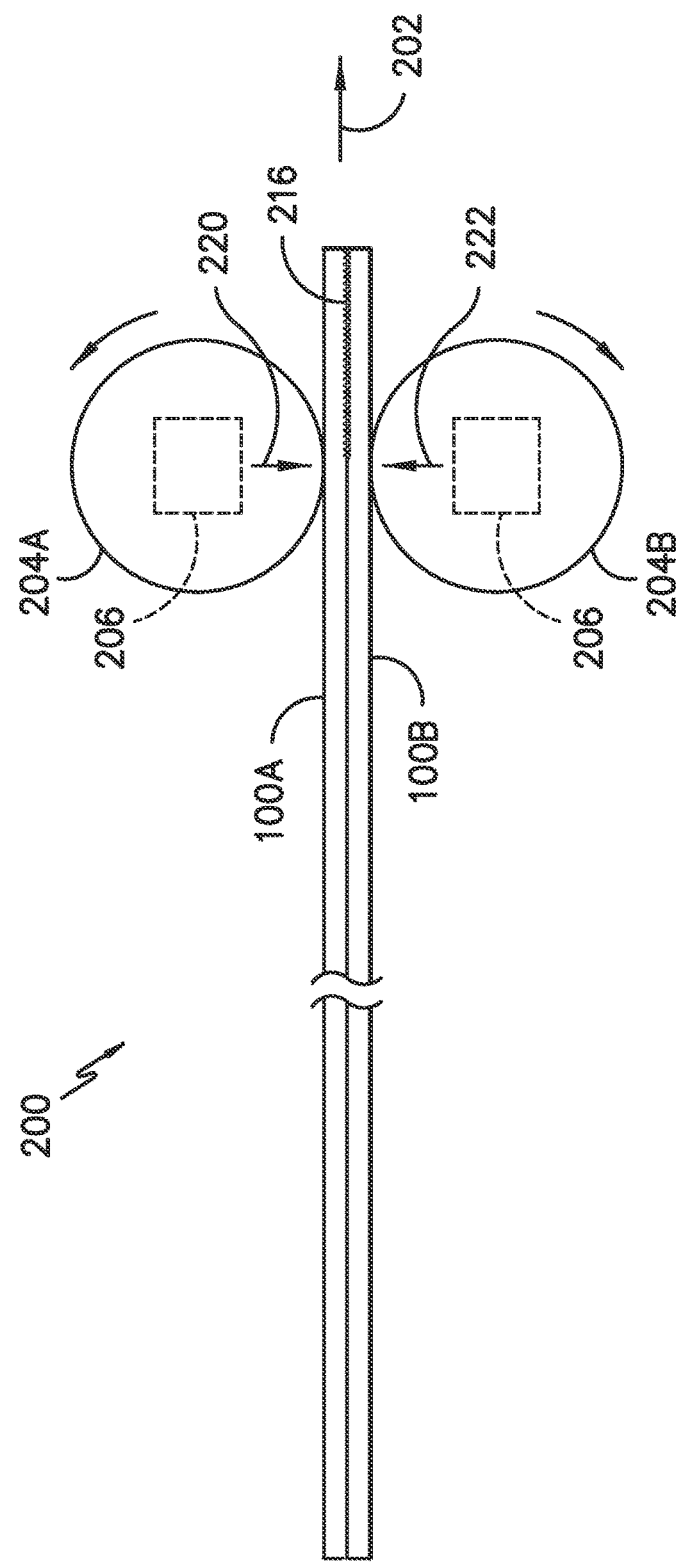
FIG. -8-

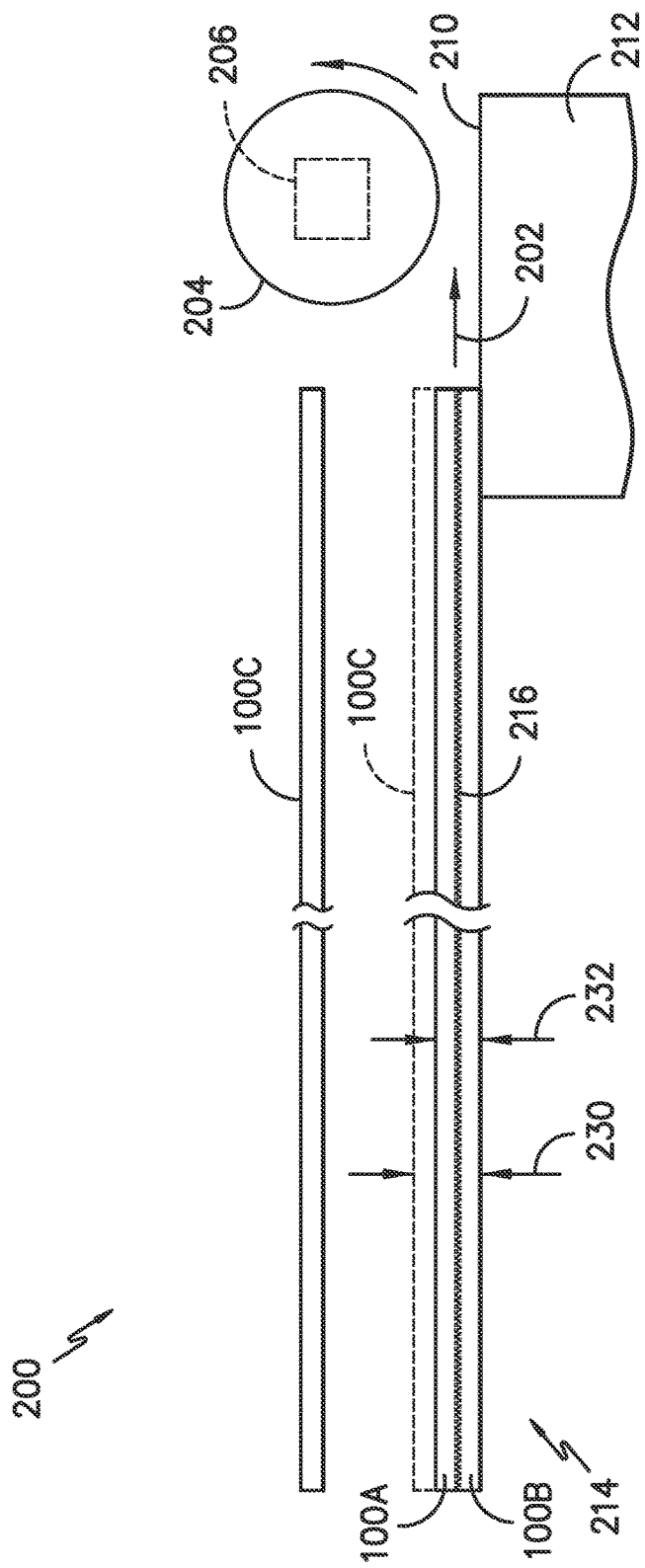
FIG. -9-

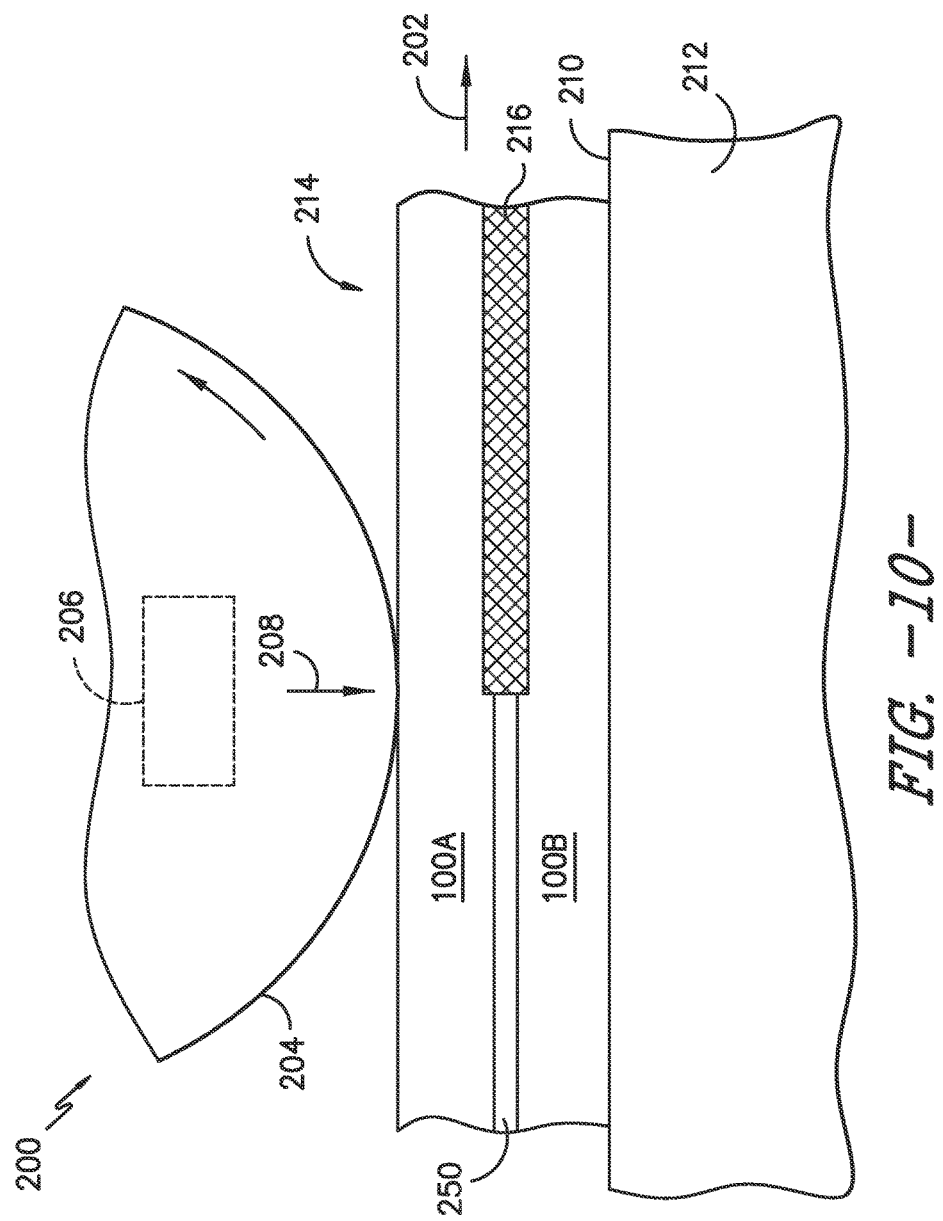

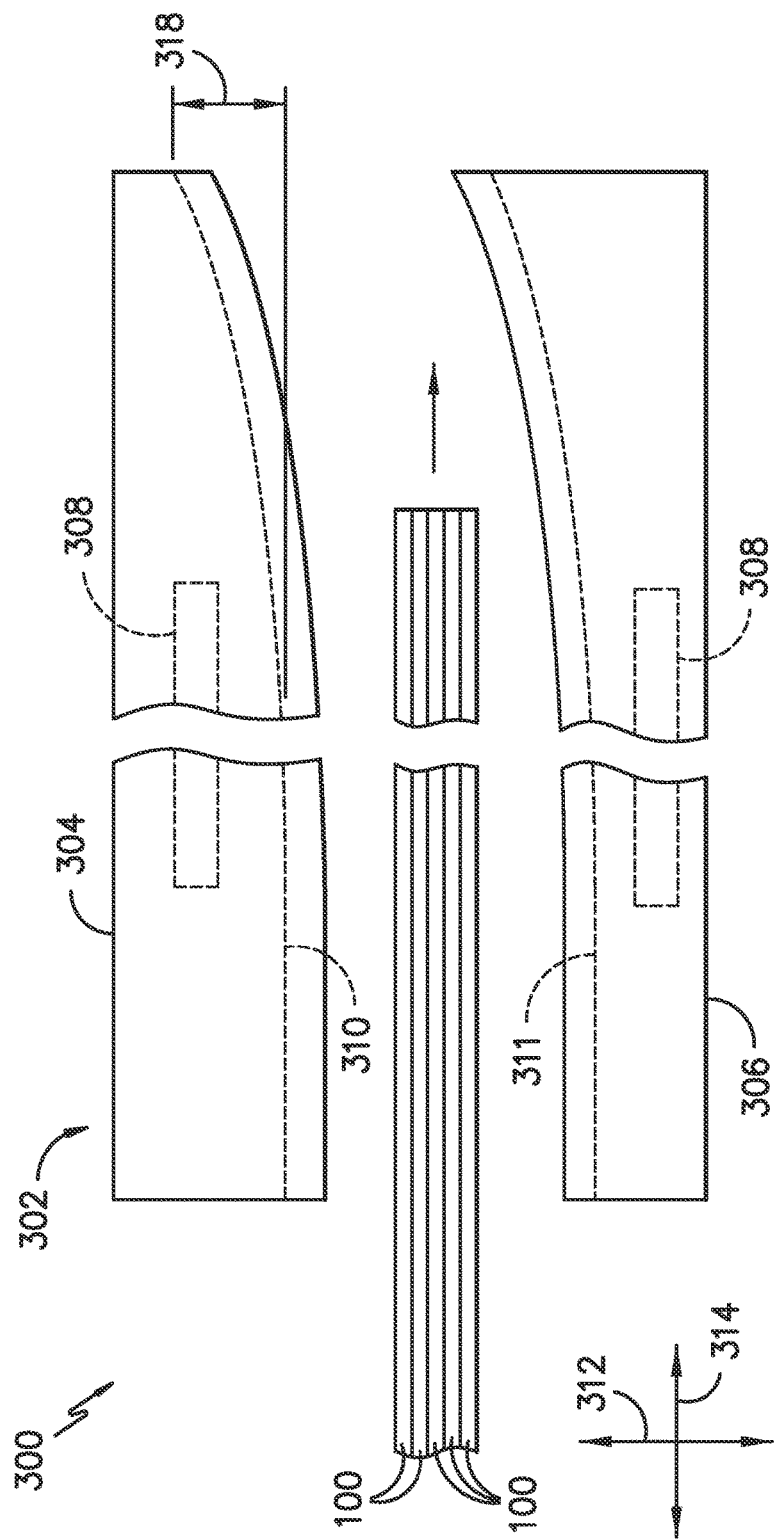
FIG. -11-

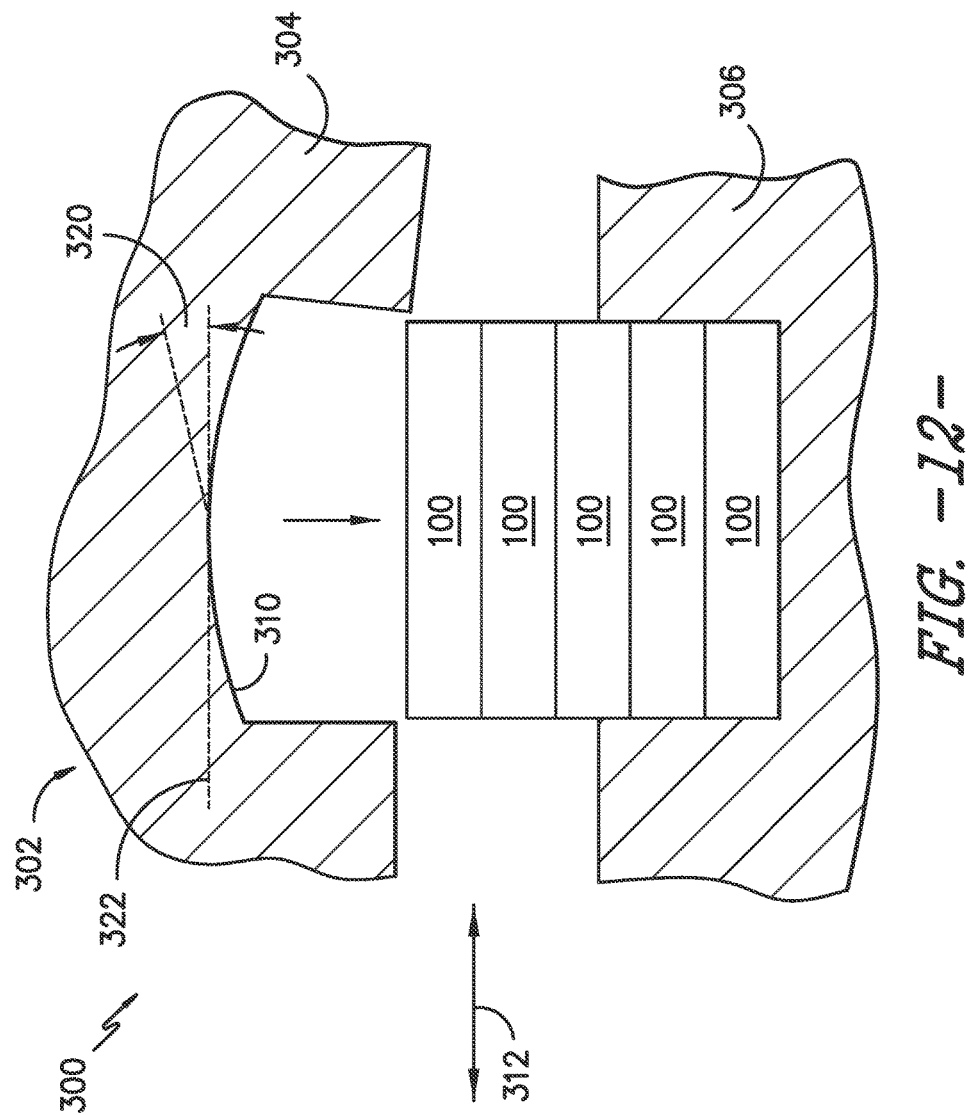
FIG. -12-

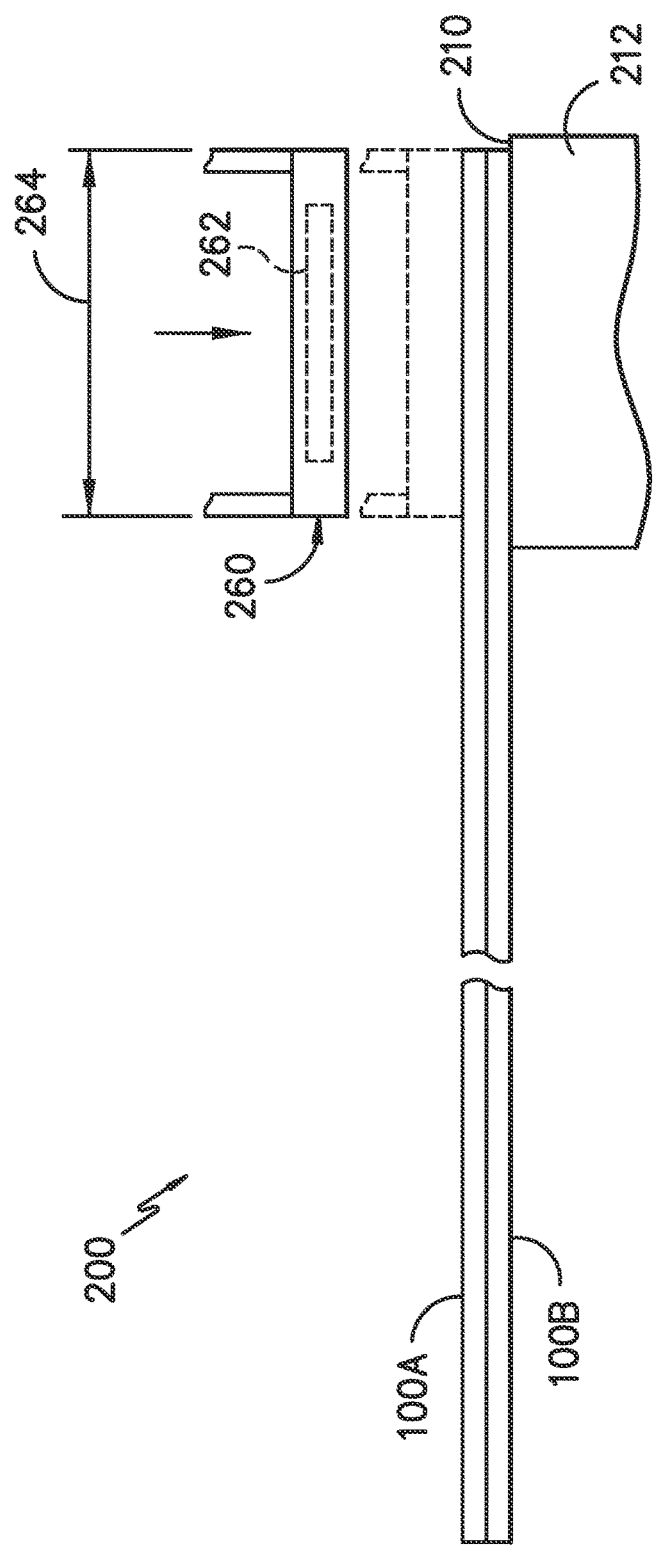
FIG. -13-

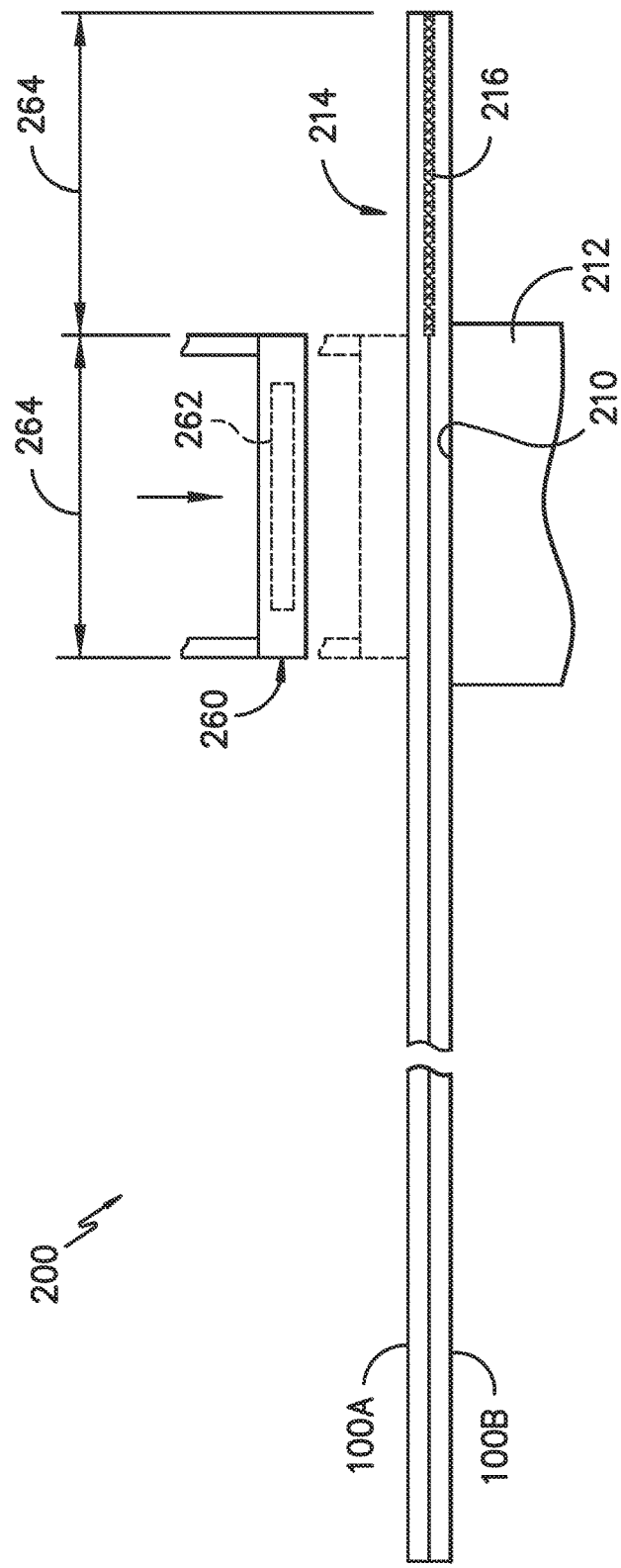
FIG. -14-

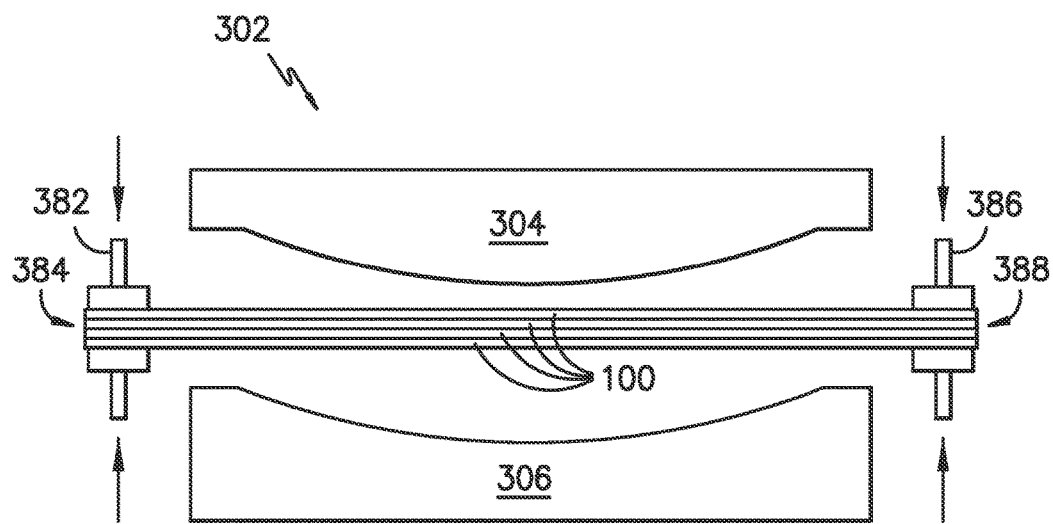
FIG. -15-
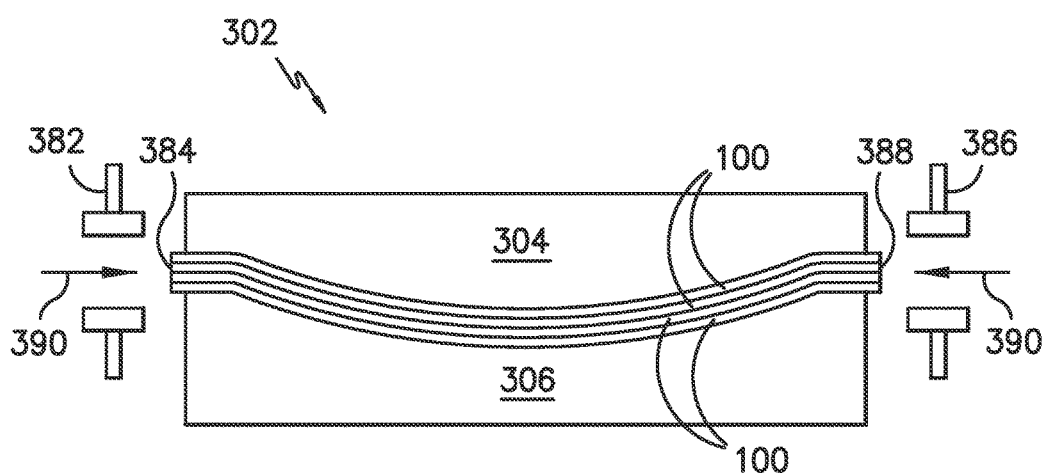
FIG. -16-

METHODS FOR MANUFACTURING SPAR CAPS FOR WIND TURBINE ROTOR BLADES USING THERMOPLASTIC-BASED COMPOSITE PLATES

FIELD OF THE INVENTION

The present subject matter relates generally to spar caps for wind turbine rotor blades and, more particularly, to a method for manufacturing a spar cap using thermoplastic-based composite plates.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades typically include an outer body skin or shell formed from a composite laminate material. In general, the body shell is relatively lightweight and has structural properties (e.g., stiffness, buckling resistance and strength) which are not configured to withstand the bending moments and other loads exerted on the rotor blade during operation. In addition, wind turbine rotor blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposing spar caps with a shear web configured therebetween) that engage the inner surfaces of the shell. The spar caps are typically constructed from laminate composites (e.g., glass fiber laminate composites and/or carbon fiber laminate composites) that include dry or non-cured fabric plies that are laid up within the blade mold and subsequently infused with resin. Such materials, however, can be difficult to control during the manufacturing process and/or are often defect prone and/or highly labor intensive due to handling of the non-cured fabrics and the challenges of infusing large laminated structures.

As such, recent attempts have been made to form spar caps from pre-fabricated, pre-formed composites that can be produced in thicker sections, and are typically less susceptible to defects. However, the use of these thicker, pre-formed composites also presents unique challenges during the blade manufacturing process. For example, such composites often present challenges with respect to coupling or bonding adjacent composite structures together to form the spar cap.

Accordingly, an improved method for manufacturing a spar cap using thermoplastic-based composite plates that allows for adjacent plates to be easily and efficiently secured to one another would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for manufacturing a spar cap for a wind turbine rotor blade. The method may generally include stacking a plurality of plates together to form a plate assembly, wherein each of the plates is formed from a continuous fiber-reinforced composite including a plurality of fibers surrounded by a thermoplastic resin material. The method may also include positioning the plate assembly relative to a mold defining a mold surface, wherein the mold surface is shaped so as to correspond to at least one blade parameter of the wind turbine rotor blade. In addition, the method may include applying pressure to the plate assembly via the mold such that at least a portion of the plate assembly conforms to the shape of the mold surface.

In another aspect, the present subject matter is directed to a system for manufacturing a spar cap for a wind turbine rotor blade. The system may include a plate assembly including a plurality of plates positioned one on top of another, wherein each of the plates is formed from a continuous fiber-reinforced composite including a plurality of fibers surrounded by a thermoplastic resin material. In addition, the system may include a mold defining a mold surface, wherein the mold surface is shaped so as to correspond to at least one blade parameter of the wind turbine rotor blade. The mold may be configured to apply pressure to the plate assembly such that at least a portion of the plate assembly conforms to the shape of the mold surface.

In a further aspect, the present subject matter is directed to a method for manufacturing a spar cap for a wind turbine rotor blade. The method may generally include stacking a first plate on top of a second plate, wherein each of the plates is formed from a continuous fiber-reinforced composite including a plurality of fibers surrounded by a thermoplastic resin material. The method may also include transporting the first and second plates past a heated roller to heat the thermoplastic resin material of the plates and pressing the first and second plates together such that the thermoplastic resin material of the first plate is welded to the thermoplastic resin material of the second plate to form a first plate assembly.

In an additional aspect, the present subject matter is directed to a system for manufacturing a spar cap for a wind turbine rotor blade. The system may include a first plate stacked on top of a second plate, wherein each of the plates is formed from a continuous fiber-reinforced composite including a plurality of fibers surrounded by a thermoplastic resin material. In addition, the system may include a heated roller configured to heat the thermoplastic resin material of the plates as the plates are transported past the heated roller. Moreover, the heated roller may be configured to press the first and second plates together such that the thermoplastic resin material of the first plate is welded to the thermoplastic resin material of the second plate to form a first plate assembly.

In yet another aspect, the present subject matter is directed to a method for manufacturing a spar cap for a wind turbine rotor blade. The method may generally include assembling a plurality of plates one on top of another, wherein each of the plates is formed from a continuous fiber-reinforced composite including a plurality of fibers surrounded by a thermoplastic resin material. The method may also include positioning the plates relative to a heated pressing device and pressing the plates together via the heated pressing device as heat is being transferred from the heated pressing device to the thermoplastic resin material contained within each of the plates such that the plates are welded to one another to form a plate assembly.

In a further aspect, the present subject matter is directed to a system for manufacturing a spar cap for a wind turbine rotor blade. The system may include an assembly of plates stacked one on top of another, wherein each of the plates is formed from a continuous fiber-reinforced composite including a plurality of fibers surrounded by a thermoplastic resin material. In addition, the system may include a heated pressing device configured to press the plates together as heat is being transferred from the heated pressing device to the thermoplastic resin material contained within each of the plates such that the plates are welded to one another to form a plate assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective view of one embodiment of a rotor blade suitable for use within the wind turbine shown in FIG. 1 in accordance with aspects of the present subject matter;

FIG. 3 illustrates a cross-sectional view of the rotor blade shown in FIG. 2 taken about line 3-3;

FIG. 4 illustrates a close-up view of a portion of the rotor blade shown in FIG. 3, particularly illustrating a spar cap of the rotor blade formed from an assembly of pre-formed composite plates;

FIG. 5 illustrates a perspective view of a portion of one of the composite plates shown in FIG. 4;

FIG. 6 illustrates a simplified view of one embodiment of a system for manufacturing a spar cap from pre-formed, composite plates in accordance with aspects of the present subject matter, particularly illustrating a stack of plates being transported across a heated roller;

FIG. 7 illustrates a close-up view of a portion of the system shown in FIG. 6, particularly illustrating a welded joint being formed between adjacent composite plates as the plates are heated and compressed by the heated roller;

FIG. 8 illustrates another embodiment of the system shown in FIG. 6, particularly illustrating the stack of plates being transported between opposed heated rollers;

FIG. 9 illustrates another simplified view of the system shown in FIG. 6, particularly illustrating an additional plate being added to a previously formed welded plate assembly to build-up the thickness of the spar cap being manufactured;

FIG. 10 illustrates a similar close-up view to that shown in FIG. 7, particularly illustrating an additional layer(s) of thermoplastic resin material positioned between the adjacent plates;

FIG. 11 illustrates a simplified view of another embodiment of a system for manufacturing a spar cap from pre-formed, composite plates in accordance with aspects of the present subject matter, particularly illustrating a stack of plates being inserted between opposed mold portions of a mold;

FIG. 12 illustrates a close-up, chordwise view of a portion of the system shown in FIG. 11, particularly illustrating the stack of plates positioned between the upper and lower mold portions of the mold;

FIG. 13 illustrates another embodiment of the system shown in FIG. 6, particularly illustrating a spanwise section of the stack of plates being welded together using a heated pressing device;

FIG. 14 illustrates another view of the embodiment of the system shown in FIG. 13, particularly illustrating the stack of plates after it has been moved relative to the heated pressing device to allow another spanwise section of the plates to be welded together;

FIG. 15 illustrates another simplified view a stack of plates being inserted between upper and lower mold portions of a mold, particularly illustrating the plates being initially clamped together at their ends via one or more clamping devices; and FIG. 16 illustrates another view of the stack of plates shown in FIG. 15 after the mold has been closed, particularly illustrating the clamping devices being released to allow the plates to pull inwardly as the mold closes.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods for manufacturing spar caps for wind turbine rotor blades using thermoplastic-based, pre-formed composite plates, such as pultruded plates. Specifically, in several embodiments, a spar cap for a rotor blade may be formed by welding a plurality of composite plates together, with each individual plate being formed from a continuous fiber-reinforced composite including a plurality of fibers surrounded by a thermoplastic resin material. For example, in one embodiment, a stack of two or more plates may be transported past a heated roller that applies heat and pressure to the stack in order to weld the plates to one another. In another embodiment, the stack of plates may be welded together in spanwise sections using a heated press or any other suitable device(s) configured to apply heat and pressure to a given spanwise section of the stacked plates. In a further embodiment, the stack of plates may be positioned within a heated mold configured to apply heat and pressure to the stack so as to weld the plates together.

Additionally, in a particular embodiment, the stack of plates may be shaped so as to conform to a portion of the aerodynamic shape of the rotor blade within which the resulting spar cap will be installed. Such shaping of the plate stack may be performed while the individual plates are being welded together or after the plates have been welded together. For instance, in one embodiment, a stack of pre-formed composite plates may be inserted within a mold including at least one mold surface that is shaped so as to match the shape of the portion of the rotor blade shell along which the resulting spar cap will extend. As such, when pressure is applied to the stack of plates via the mold, an outer surface(s) of the stack positioned adjacent to the mold surface(s) may be molded to the shape of the rotor blade, such as by molding the outer surface(s) to match the chordwise curvature, the spanwise curvature and/or the twist of the rotor blade. Accordingly, when the resulting spar cap is subsequently being installed within the rotor blade, the outer surface(s) of the spar cap may match the corresponding inner surface(s) of the rotor blade shell, thereby allowing the spar cap to conform to the blade shape without requiring that the spar cap be pre-stressed and/or manufactured in a manner that reduces its structural integrity.

It should be appreciated that, as described herein, thermoplastic materials generally encompass a plastic material(s) or polymer(s) that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, thermoset materials generally encompass a plastic material(s) or polymer(s) that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2 and 3, one embodiment of a rotor blade 22 suitable for use within the wind turbine 10 shown in FIG. 1 is illustrated in accordance with aspects of the present subject matter. Specifically, FIG. 2 illustrates a perspective view of the rotor blade 22. Additionally, FIG. 3 illustrates a cross-sectional view of the rotor blade 22 taken about line 3-3 shown in FIG. 2.

As shown, the rotor blade 22 generally includes a blade root 24 configured to be mounted or otherwise secured to the hub 20 (FIG. 1) of the wind turbine 10 and a blade tip 26 disposed opposite the blade root 24. Additionally, the rotor blade 22 may include a body shell 28 configured to extend between the blade root 24 and the blade tip 26 along a longitudinal axis 30 of the blade 22. The body shell 28 may generally serve as the outer casing/covering of the rotor blade 22 and may define a substantially aerodynamic profile, such as by defining a symmetrical or cambered airfoil-shaped cross-section. For example, as shown in FIG. 3, the body shell 28 may define a pressure side 32 and a suction side 34 extending between leading and trailing edges 36, 38 of the rotor blade 22. Further, the rotor blade 22 may also have a span 40 defining the total length between the blade root 24 and the blade tip 26 and a chord 42 defining the total length between the leading edge 36 and the trailing edge 38. As is generally understood, the chord 42 may generally vary in length with respect to the span 40 as the rotor blade 22 extends from the blade root 24 to the blade tip 26.

In several embodiments, the body shell 28 of the rotor blade 22 may be formed from a plurality of shell components or sections. For example, in one embodiment, the body shell 28 may be manufactured from a first shell half or section generally defining the pressure side 32 of the rotor blade 22 and a second shell half or section generally defining the suction side 34 of the rotor blade 22, with such shell sections being secured to one another at the leading and trailing edges 36, 38 of the blade 22. Alternatively, the body shell 28 may be formed from any other suitable number and/or arrangement of shell sections. For instance, in one embodiment, the body shell 28 may be segmented along the longitudinal axis 30 of the rotor blade 22, with each spanwise segment being formed from one or more shell sections.

Additionally, the body shell 28 may generally be formed from any suitable material. For instance, in one embodiment, the body shell 28 may be formed entirely from a laminate composite material, such as a carbon fiber reinforced laminate composite or a glass fiber reinforced laminate composite. Alternatively, one or more portions of the body shell 28 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 22 may also include one or more longitudinally extending structural components configured to provide increased stiffness, buckling resistance and/or strength to the blade 22. For example, the rotor blade 22 may include a pair of longitudinally extending spar caps 44, 46 configured to be engaged against opposing inner surfaces 48, 50 of the pressure and suction sides 32, 34 of the rotor blade 22, respectively. Additionally, one or more shear webs 52 may be disposed between the spar caps 44, 46 so as to form a beam-like configuration. The spar caps 44, 46 may generally be designed to control the bending stresses and/or other loads acting on the rotor blade 22 in a generally spanwise direction (a direction parallel to the span 40 of the rotor blade 22) during operation of a wind turbine 10. Similarly, the spar caps 44, 46 may also be designed to withstand the spanwise compression occurring during operation of the wind turbine 10.

Referring now to FIG. 4, a close-up, cross-sectional view of one of the spar caps 46 shown in FIG. 3 is illustrated in accordance with aspects of the present subject matter, particularly illustrating the spar cap 46 being constructed or formed from a plurality of pre-formed composite plates 100. In addition, FIG. 5 illustrates a more detailed, cross-sectional view of a portion of one of the pre-formed composite plates 100 shown in FIG. 4.

In several embodiments, each pre-formed plate 100 may correspond to a pultruded plate. In such embodiments, one or more fiber materials 102 (e.g., glass or carbon fibers) may be formed during the manufacturing process to form each individual pultruded plate. For example, the fibers 102 may be impregnated with at least one resin material 104 using any suitable means. As indicated above, the resin material 104 may correspond to a thermoplastic resin material. The impregnated fibers 102 may then be pulled through a heated stationary die or any other suitable device to form each plate 100. The individually formed plates 100 may then be assembled or joined together to form the resulting spar cap 46. For instance, as shown in FIG. 4, each pre-formed plate 100 may form a single layer 106 of the spar cap 46. As will be described below with reference to FIGS. 6-12, the individual layers 106 may then be stacked one on top of the other and welded together to form the spar cap 46. The resulting pre-fabricated spar cap 46 may then be installed and/or assembled within the rotor blade 22, such as by integrating the spar cap 46 into the body shell 28 or otherwise securing the spar cap 46 to the body shell 28 along the pressure or suction side 32, 34 of the blade 22.

As particularly shown in FIG. 5, the fibers 102 included within each plate 100 may generally be oriented in a common fiber direction 108. In several embodiments, the fiber direction 108 may extend parallel to the longitudinal or spanwise direction of the rotor blade 22. As such, the fibers 102 contained within each plate 100 used to form the spar cap 46 may generally extend continuously in the spanwise direction along the length of the spar cap 46 between the blade root 24 and the blade tip 26. In addition, each plate 100 may also include fibers 102 oriented in any other suitable direction.

Referring now to FIGS. 6 and 7, one embodiment of a system 200 for manufacturing a spar cap from pre-formed, composite plates 100 is illustrated in accordance with aspects of the present subject matter. One embodiment of a related method for manufacturing a spar cap from pre-formed, composite plates 100 will also be described with reference to FIGS. 6 and 7.

In several embodiments, two or more pre-formed, composite plates 100 may be initially stacked one on top of the other. For example, as shown in FIG. 6, a first plate 100A may be stacked on top of a second plate 100B (as indicated by the dashed lines in FIG. 6). In such an embodiment, the first and second plates 100A, 100B may each be formed from a thermoplastic-based fiber-reinforced composite. For instance, each plate 100A, 100B may correspond to a pultruded plate including a plurality of continuous fibers (e.g., the fibers 102 shown in FIG. 5) surrounded by a thermoplastic resin material (e.g., the resin material 104 shown in FIG. 5).

Additionally, as shown in FIGS. 6 and 7, the stack of plates 100A, 100B may then be transported in a processing direction (e.g., as indicated by arrow 202 shown in FIGS. 6 and 7) past a heated roller 204. In general, the heated roller 204 may be configured to heat the thermoplastic resin material of the first and second plates 100A, 100B as the plates 100A, 100B are passed by the roller 204. For example, the heated roller 204 may include or be coupled to a heat source 206, such as an electric heating device, that is configured to heat the roller 204 to a specified temperature. Thus, as the plates 100A, 100B are moved past the heated roller 204, heat may be transferred from the roller 204 to the plates 100A, 100B.

In addition, the heated roller 204 may also be configured to press the first and second plates 100A, 100B together. For instance, in the illustrated embodiment, the heated roller 204 may be configured to apply a downward force against the first and second plates (e.g., as indicated by arrow 208 in FIG. 7) such that the plates 100A, 100B are compressed between the outer circumference of the roller 204 and an opposed surface 210 of an adjacent component 212 (e.g., a support platform configured to vertically support the plates 100A, 100B). By simultaneously heating and compressing the first and second plates 100A, 100B, the heated thermoplastic resin material of the first plate 100A may be welded to the heated thermoplastic resin material of the second plate 100B. Thus, as shown in FIG. 7, a welded plate assembly 214 may be formed that includes a welded joint 216 at the interface defined between the first and second plates 100A, 100B.

It should be appreciated that the particular temperature at which the thermoplastic resin material of the first and second plates 100A, 100B should be heated to allow the plates 100A, 100B to be welded together may generally vary depending on the resin chemistry of the thermoplastic resin material being utilized. However, in general, for an amorphous thermoplastic resin material, the thermoplastic resin material may be heated to a temperature at or above the glass transition temperature associated with such amorphous thermoplastic resin material to allow the plates 100A, 100B to be welded together. Similarly, for a semi-crystalline thermoplastic resin material, the thermoplastic resin material may be heated to a temperature at or above the melting temperature of such semi-crystalline thermoplastic resin material to allow the plates 100A, 100B to be welded together.

It should also be appreciated that, as an alternative to the single heated roller 204 shown in FIGS. 6 and 7, the stacked plates 100A, 100B may be configured to be transported between opposed, heated rollers. For instance, as shown in FIG. 8, the stacked plates 100A, 100B may be passed between a first heated roller 204A positioned directly above the plates 100A, 100B and a second heated roller 204B positioned directly below the plates 100A, 100B. In such an embodiment, the first heated roller 204A may be configured to apply a downward force against the stacked plates 100A, 100B (as indicated by arrow 220 in FIG. 8) while the second heated roller 204B may be configured to apply an upward force against the stacked plates 100A, 100B (as indicated by arrow 222 in FIG. 8). As such, the plates 100A, 100B may be compressed between the rollers 204A, 204B as heat is transferred from the rollers 204A, 204B to the plates 100A, 100B to allow such plates 100A, 100B to be thermoplastically welded together.

Additionally, it should be appreciated that, in alternative embodiments, the system 200 may include a separate heat source configured to serve as the primary means for heating the thermoplastic resin material or as a secondary heating means in addition to the heated roller(s) 204. For instance, in one embodiment, a heating device may be positioned directly upstream of the roller(s) 204 to heat the thermoplastic resin material of the plates 100A, 100B prior to the plates 100A, 100B transported past the roller(s) 204. In such an embodiment, the roller(s) 204 may correspond to a heated or a non-heated roller(s) configured to apply pressure to the stacked plates 100A, 100B.

Moreover, the above-described method for welding preformed composite plates 100 to one another may be repeated with one or more additional plates to build-up the thickness of the spar cap being manufactured. For instance, as shown in FIG. 9, a third plate 100C may be assembled relative to the welded plate assembly 214 previously formed from the first and second plates 100A, 100B, such as by stacking the third plate 100C on top of the plate assembly 214 (as indicated by the dashed lines in FIG. 9) or by stacking the plate assembly 214 on top of the third plate 100C. Regardless, the resulting plate stack may be transported past the heated roller(s) 204 such that the thermoplastic resin material contained within the third plate 100C and the plate assembly 214 is heated as such components are being pressed together via the roller(s) 204. As such, the thermoplastic resin material of the third plate 100C may be welded to the thermoplastic resin material of the welded plate assembly 214 to form a second welded plate assembly having a thickness 230 that is greater than a thickness 232 of the previously formed plate assembly 214. Thereafter, if desired, one or more additional plates 100, such as a fourth plate, a fifth plate, etc., may be similarly welded onto the resulting plate assembly to further increase the overall thickness of the spar cap being manufactured.

As indicated above, in several embodiments, the preformed, composite plates may be configured to be stacked directly one on top of another when welding the plates together to manufacture a spar cap. Alternatively, one or more additional layers of thermoplastic resin material may be provided between each adjacent pair of plates. For example, FIG. 10 illustrates an additional layer(s) 250 of thermoplastic resin material positioned between the first and second plates 100A, 100B described above with reference to FIGS. 6 and 7. In such an embodiment, the additional thermoplastic material may serve as donor material for the welding process. Specifically, when the plates 100A, 100B are transported past the heated roller(s) 204, both the thermoplastic resin material contained within the plates 100A, 100B and the additional layer(s) 250 of thermoplastic resin material may be heated and pressed together to form the welded joint 216 between the first and second plates 100A, 100B.

It should be appreciated that, in the embodiment shown in FIG. 10, the additional layer(s) 250 of thermoplastic resin material may consist entirely of resin material. Alternatively, the additional layer(s) 250 may be fiber-reinforced and, thus, may include a plurality of fibers (e.g., carbon and/or glass fibers) surrounded by the thermoplastic resin material. In such an embodiment, it may be desirable for the additional layer(s) 250 to have a fiber-weight fraction that is less than the fiber-weight fractions of the first and second plates 100A, 100B. As such, the additional layer(s) 250 may have a higher concentration of thermoplastic resin material than the plates 100A, 100B. As used herein, the term "fiber-weight fraction" generally refers to the percentage of fibers by weight contained within a given volume of a fiber-reinforced composite. For instance, to calculate the fiber-weight fraction of the additional layer(s) 250, the weight of all of the fibers contained within the additional layer(s) 250 may be divided by the total weight of the additional layer(s) (i.e., the weight of both the fibers and the thermoplastic resin material), with the resulting value being multiplied by 100 to obtain the percentage.

Additionally, it should be appreciated that, as an alternative to the roller(s) 204, the system 200 may include any other suitable device(s) configured to weld the stacked plates 100A, 100B together. For instance, in several embodiments, the system 200 may include a heated pressing device that is configured to apply heat and pressure along a spanwise section of the stacked plates 100A, 100B to weld the plates 100A, 100B together across such spanwise section. The stacked plates 100A, 100B may then be moved relative to the heated pressing device to allow a different spanwise section of the plates 100A, 100B to be welded together.

For example, FIGS. 13 and 14 illustrate one embodiment of the disclosed system 200 in which a heated pressing device 260 is used to weld the stacked plates 100A, 100B together. As shown in FIG. 13, the heated pressing device 260 may be configured to apply a compressive force against a spanwise section 264 of the stacked plates 100A, 100B. For example, the heated pressing device 260 may be movable between an opened position (shown in solid lines in FIGS. 13 and 14), at which the stacked plates 100A, 100B may be moved relative to the device 260, and a closed position (shown in dashed lines in FIGS. 13 and 14), at which the heated pressing device 260 applies a compressive force against the stacked plates 100A, 100B so as to press the plates 100A, 100B together. In addition, the heated pressing device 260 may include or be coupled to a heat source 262, such as an electric heating device, that is configured to heat the device 260 to a specified temperature. Thus, when the heated pressing device 260 is moved to its closed position in order to compress the plates 100A, 100B, heat may be transferred from the device 260 to the plates 100A, 100B. Similar to the embodiments described above, by simultaneously heating and compressing the first and second plates 100A, 100B, the heated thermoplastic resin material of the first plate 100A may be welded to the heated thermoplastic resin material of the second plate 100B. Thus, as shown in FIG. 14, a welded plate assembly 214 may be formed that includes a welded joint 216 at the interface defined between the first and second plates 100A, 100B.

Using the heated pressing device 260, the stacked plates 100A, 100B may be welded together incrementally along their spanwise length. Specifically, after a given spanwise section 264 of the stacked plates 100A, 100B are initially welded together (e.g., as shown in FIG. 13), the heated pressing device 260 may be moved to its opened position to allow the plates 100A, 100B to be moved relative to the device 260. For example, as shown in FIG. 14, the plates 100A, 100B may be moved relative to the device 260 a distance corresponding to the length of the spanwise section 264 previously welded to allow the next spanwise section 264 of the plates 100A, 100B to be welded together. Thereafter, the heated pressing device 260 may be moved to its closed position to weld the plates 100A, 100B together across the next spanwise section 264.

It should be appreciated that the heated pressing device 260 may generally correspond to any suitable device(s), mechanism(s) and/or component(s) that is configured to apply a combination of heat and pressure to a given spanwise section 264 of the stacked plates 100A, 100B. For example, in one embodiment, the heated pressing device 260 may correspond to a heated press. In another embodiment, the heated pressing device 260 may correspond to an inflatable, heated bladder that, when inflated, applies heat and pressure to the stacked plates 100A, 100B.

As shown in FIGS. 13 and 14, the heated pressing device 260 is configured to compress the stacked plates 100A, 100B against an opposed surface 210 of an adjacent component 212 (e.g., a support platform configured to vertically support the plates 100A, 100B). However, it should be appreciated that, in alternative embodiments, the heated pressing device 260 may be configured to apply heat and pressure along both sides of the stacked plates 100A, 100B. For instance, in an embodiment in which the heated pressing device 260 corresponds to a heated press, the device 260 may include a first press portion positioned directly above the plates 100A, 100B and a second press portion positioned directly below the plates 100A, 100B. In such an embodiment, the stacked plates 100A, 100B may be compressed between the first and second press portions to allow the plates 100A, 100B to be thermoplastically welded together along the spanwise section 264.

Referring now to FIGS. 11 and 12, another embodiment of a system 300 for manufacturing a spar cap from pre-formed, composite plates is illustrated in accordance with aspects of the present subject matter. Additionally, one embodiment of a related method for manufacturing a spar cap from pre-formed, composite plates 100 will also be described with reference to FIGS. 11 and 12.

As shown, unlike the embodiment described above, the pre-formed, composite plates 100 may be configured to be welded together using a mold 302. Specifically, in several embodiments, a plurality of pre-formed, composite plates 100 may be assembled together and positioned within the mold 302, such as by stacking the plates 100 one on top of the other and properly positioning the stacked plates 100 relative to the mold 302. For instance, as shown in FIGS. 11 and 12, the mold 302 includes an upper mold portion 304 and a lower mold portion 306. In several embodiments, the mold 302 may correspond to a heated mold, with each mold portion 304, 306 including or being coupled to a heat source 308, such as an electric heating device, that is configured to heat the mold portion 304, 306 to a specified temperature. As such, the stacked plates 100 may be configured to be positioned between the upper and lower mold portions 304, 306. Thereafter, the mold 302 may be closed around the stacked plates 100 so as to simultaneously compress and heat the plates 100. For instance, the plates 100 may be compressed between the upper and lower mold portions 304, 306 as heat is being transferred from the mold portions 304, 306 to the thermoplastic resin material contained within each of the plates 100. A resulting welded plate assembly may then be formed from the compressed/heated plates 100, with a welded joint being defined between each pair of adjacent plates 100. The welded plate assembly may then be installed as a spar cap within a wind turbine rotor blade.

It should be appreciated that, in other embodiments, the mold 302 may only include an upper mold portion or a lower mold portion. In such an embodiment, a stationary component (e.g., a support platform) may be positioned on the opposed side of the mold 302 to allow the plates 100 to be compressed together.

Additionally, it should be appreciated that, similar to the embodiment described above, the plates 100 may be configured to be stacked directly one on top of another. Alternatively, one or more additional layers 250 (FIG. 10) of thermoplastic resin material may be provided between each adjacent pair of plates 100. In such an embodiment, the plates 100 positioned within the heated mold 302 may be stacked in an alternating arrangement such that each adjacent pair of plates 100 is separated from one another by the additional layer(s) 250 of thermoplastic resin material.

It should also be appreciated that, in several embodiments, the stacked plates 100 may be configured to be pre-heated prior to being positioned within the mold 302. In such embodiments, the mold 302 may correspond to a heated mold, a non-heated mold or a cooled mold. For instance, in one embodiment, the plates 100 may be initially placed within an oven or may be pre-heated used any other suitable device to allow the thermoplastic resin material contained within the plates 100 to be heated to a temperature above the welding temperature for the material (e.g., the glass transition temperature for an amorphous thermoplastic resin material or the melting temperature for a semi-crystalline thermoplastic resin material). In such instance, the mold 302 may not be configured to transfer heat to the stacked plates 100 and, in fact, may be configured to reduce the temperature of the plates 100 as they are compressed within the mold 302. In another embodiment, the plates 100 may be pre-heated to allow the thermoplastic resin material contained within the plates 100 to be heated to a temperature at or just below the welding temperature for the material. In such instance, the mold 302 may need to be configured to transfer heat to the stacked plates 100 to allow the plates 100 to be welded together. Regardless, once pre-heated, the stacked plates 100 may then be moved to the mold 302 to allow the plates 100 to be welded together and/or formed. In doing so, it is been found that the fibers contained within the plates 100 provide sufficient structural support to allow the pre-heated assembly to be transported to the mold 302.

Additionally, it should be appreciated that, when pre-heating the stacked plates 100, it may be desirable to securely clamp the plates 100 together using one or more clamping devices. However, when subsequently compressing the plates 100 within the mold 302, the clamping device(s) should be released or removed to allow the plates 100 to move relative to one another as the plates 100 are compressed. For instance, the clamping device(s) may correspond to a releasable clamping device(s) that is configured to allow the plates 100 to pull out of the device(s) when the mold 302 is closed and the plates 100 are compressed. Alternatively, the clamping device(s) may correspond to an electronically controlled clamping device(s) that is configured to automatically release the stacked plates 100 when the mold 302 is closed.

For example, FIGS. 15 and 16 illustrate simplified views of one example of a stack of plates 100 being clamped together and then released as the mold is closed down onto the plates 100. Specifically, as shown in FIG. 15, one or more first clamping devices 382 may be installed along a first side 384 of the stack of plates 100 and one or more second clamping devices 386 may be installed along a second side 388 of the stack of plates 100. For instance, as indicated above, the clamping devices 382, 386 may be installed in order to clamp the plates 100 together as they are being pre-heated. Upon pre-heated, the clamped stack of plates 100 may then be transferred to the mold 302. As shown in FIG. 16, when the mold 302 is closed down onto the stack of plates 100, the clamping devices 382, 386 may release the plates 100 to allow the material to pull in around its edges. For example, as shown in FIG. 16, when the mold 302 is closed and the plates 100 are released from the clamping devices 382, 386, the sides 384, 388 of the plates 100 may be pulled inwardly (as indicated by arrows 390 in FIG. 16).

Referring back to FIGS. 11 and 12, in several embodiments, at least one surface of the mold 302 may be shaped so as to correspond to at least one blade parameter that varies along a span of a wind turbine rotor blade. In such embodiments, when the pultruded plates 100 are pressed together within the mold 302, at least a portion of the resulting welded plate assembly may conform to the shape of the mold surface. Thereafter, when the plate assembly is installed as a spar cap within a corresponding rotor blade, the plate assembly may generally conform to the aerodynamic profile of the portion of the blade shell along which the spar cap extends.

For instance, as shown in the illustrated embodiment, a mold surface 310 of the upper mold portion 304 may be configured to define a profile in a chordwise direction (indicated by arrow 312 in FIGS. 11 and 12) and/or a spanwise direction (indicated by arrow 314 FIG. 11) that matches or substantially matches the chordwise profile and/or the spanwise profile of the rotor blade 22 within which the spar cap being manufactured is to be installed. Specifically, as shown in FIG. 12, the mold surface 310 may be configured to define a chordwise curvature along its length that generally corresponds to the chordwise curvature of the portion of the blade shell 28 along which the spar cap will be installed (e.g., the chordwise curvature along a curved section 316 of the blade shell 28 shown in FIG. 4). Similarly, the mold surface 310 may be configured to define a spanwise curvature along its length that generally corresponds to the spanwise curvature of the portion of the blade shell 28 along which the spar cap will be installed. For instance, as shown in FIG. 11, the mold surface 310 may be curved along its length to accommodate any pre-bend 318 defined along the span 40 of the rotor blade 22.

The mold surface 310 may also be configured to be shaped so as to match any other suitable blade parameter(s) of the rotor blade 22 within which the spar cap will be installed. For instance, in addition to the chordwise curvature and/or the spanwise curvature, the mold surface 310 may be shaped so as to accommodate any twist within the rotor blade 22. Specifically, as is generally understood, a rotor blade 22 may be twisted along its longitudinal axis 30 such that a twist angle 320 of the rotor blade 22 generally varies as the blade extends between its blade root 24 and its blade tip 26. In such an embodiment, the mold surface 310 may be similarly twisted to match the spanwise profile of the rotor blade 22. For instance, as shown in FIG. 12, the mold surface 310 may be twisted or rotated about a reference plane 322 in order to match the twist angle 320 of the corresponding rotor blade 22.

It should be appreciated that, when the mold 302 includes upper lower mold portions 304, 306, both the upper mold portion 304 and the lower mold portion 306 may include mold surfaces shaped so as to match one or more blade parameters of the rotor blade. For instance, as shown in FIG. 11, a mold surface 311 of the lower mold portion 306 may also be shaped along its length so as to accommodate the spanwise curvature of the rotor blade 22.

It should also be appreciated that, in one embodiment, the stacked plates 100 may be shaped simultaneously with welding the plates 100 together. For instance, the plates 100 may simply be stacked together prior to being inserted into the shaped mold. Alternatively, the plates 100 may be welded together prior to being inserted into the shaped mold, such as by welding the plates 100 together using a heated roller(s) 204, a heated pressing device 260 and/or any other suitable means. In such an embodiment, the welded plate assembly may then be inserted into the shaped mold to allow one or more portions of the welded plate assembly to be shaped so as to conform to the shape of the rotor blade 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a spar cap for a wind turbine rotor blade, the method comprising:
   stacking a plurality of plates one on top of the other to form a plate assembly, each of the plurality of plates being formed from a continuous fiber-reinforced composite including a plurality of fibers surrounded by a thermoplastic resin material;
   positioning the plate assembly relative to a mold defining a mold surface, the mold surface being shaped so as to correspond to at least one blade parameter of the wind turbine rotor blade;
   clamping the plurality of plates together using one or more clamping devices;
   applying pressure to the plate assembly via the mold such that at least a portion of the plate assembly begins to conform to the shape of the mold surface; and
   releasing the plurality of plates from the one or more clamping devices as the mold begins to apply pressure to the plate assembly but before the mold is fully closed to allow the plurality of plates to move relative to one another.

2. The method of claim 1, wherein the mold corresponds to a heated mold, wherein heat is transferred from the heated mold to the thermoplastic resin material contained within each of the plurality of plates as pressure is being applied to the plate assembly.

3. The method of claim 1, further comprising pre-heating the plate assembly prior to positioning the plate assembly relative to the mold, the plurality of plates being clamped together while the plate assembly is being pre-heated.

4. The method of claim 3, wherein the thermoplastic resin material corresponds to an amorphous thermoplastic resin material, wherein pre-heating the plate assembly comprises heating the thermoplastic resin material contained within the plurality of plates to a temperature at or above a glass transition temperature of the amorphous thermoplastic resin material.

5. The method of claim 3, wherein the thermoplastic resin material corresponds to a semi-crystalline thermoplastic resin material, wherein pre-heating the plate assembly comprises heating the thermoplastic resin material contained within the plurality of plates to a temperature at or above a melting temperature of the semi-crystalline thermoplastic resin material.

6. The method of claim 1, wherein the mold comprises an upper mold portion and a lower mold portion, wherein positioning the plate assembly relative to the mold comprises positioning the plate assembly between the upper and lower mold portions.

7. The method of claim 1, further comprising welding the plurality of plates together prior to positioning the plate assembly relative to the mold, the plurality of plates being clamped together while the plurality of plates are being welded together.

8. The method of claim 1, wherein the at least one blade parameter corresponds to a blade parameter that varies along a span of the wind turbine rotor blade.

9. The method of claim 1, wherein the at least one blade parameter corresponds to at least one of a chordwise curvature, a spanwise curvature or a twist angle of the wind turbine rotor blade.

* * * * *